United States Patent [19]

Strauss et al.

[11] 3,814,013

[45] June 4, 1974

[54] STENCIL PRINTER FOR MEASURING AND MARKING CARPET ROLLS

[75] Inventors: Martin L. Strauss, 1800 Mariposa Ln., Fullerton; Philip Borsuk, 624 Tigertail Rd., Los Angeles; William Alvarez, Placentia, all of Calif.

[73] Assignee: said Strauss and Borsuk, by said Alvarez

[22] Filed: June 12, 1972

[21] Appl. No.: 262,027

Related U.S. Application Data

[63] Continuation-in-part of Ser. No. 866,805, Oct. 16, 1969, abandoned.

[52] U.S. Cl. .................... 101/121, 33/129, 101/73, 101/126

[51] Int. Cl. .................... B41l 13/08

[58] Field of Search ......... 101/118, 121, 48, 50, 72, 101/73, 74, 126; 33/127, 125 R, 128, 129, 125 M, 137 R, 138, 141 R

[56] References Cited

UNITED STATES PATENTS

| | | | |
|---|---|---|---|
| 486,964 | 11/1892 | Bates | 101/122 X |
| 615,406 | 12/1898 | Newsum | 101/74 |
| 654,263 | 7/1900 | Lewis | 101/121 |
| 1,177,825 | 4/1916 | Simpson et al. | 33/129 |
| 1,662,194 | 3/1928 | Lawson | 101/50 |
| 1,677,927 | 7/1928 | Pettee | 101/74 X |
| 2,387,867 | 7/1945 | Adams | 101/291 |
| 2,484,151 | 10/1949 | Brownell | 33/141 |
| 3,315,159 | 4/1967 | Gith | 324/71 |
| 3,321,768 | 5/1967 | Byrd | 346/74 |
| 3,541,956 | 11/1970 | Faichero et al. | 101/121 |

*Primary Examiner*—Robert E. Pulfrey
*Assistant Examiner*—R. E. Suter
*Attorney, Agent, or Firm*—Lyon & Lyon

[57] ABSTRACT

An apparatus for measuring and marking, in numbered linear units, the length of a roll of carpet or other material which has a face and a back side. The apparatus periodically prints, on the back side of the material, a linear unit which is indicative of the length of the material from the beginning of the roll. The apparatus includes an elongated tape which is driven by a sensing wheel which positively engages the back side of the material. The elongated tape operates as a stencil, having the linear units positioned at spaced intervals thereon. An inked roller prints the units on the material under the control of the tape. One or more additional rollers may be used to print identifying markings on the back side of the material.

9 Claims, 4 Drawing Figures

STENCIL PRINTER FOR MEASURING AND MARKING CARPET ROLLS

CROSS REFERENCE TO RELATED APPLICATION

The present application is a continuation-in-part of applicant's copending application Ser. No. 866,805, filed Oct. 16, 1969 for Measuring and Marking Apparatus for Carpet and the Like which is now abandoned.

BACKGROUND OF THE INVENTION

1. Field of the Invention

The present invention relates to an apparatus for measuring and marking the length of a roll of carpet or like material and, more particularly, to an apparatus for periodically printing on the back side of a length of material a linear unit which is indicative of the length of the material from the beginning thereof.

2. Description of the Prior Art

The present invention will be discussed and described in its preferred environment, namely, the carpet industry, but such discussion and description shall be understood to be by way of example only. It will be immediately apparent to those skilled in the art that the present invention finds equal utility in other environments, such as in the marking of a roll of linoleum or other yard goods or any other material where it is desired to have an indication of the length thereof.

Carpet is manufactured in long, continuous pieces which may be 100, 200 or more feet long. The carpet is then wound into rolls for delivery to a distributor and eventually to a retailer. A similar situation exists with respect to other types of floor coverings and other types of materials.

There are several substantial and serious problems presently encountered by carpet manufacturers. In the first instance, it is important that the manufacturer have an accurate indication of the length of the carpet he manufactures. The obvious reason for this is that the manufacturer is paid on the basis of the length of the carpet. Therefore, if the length measurement is inaccurate, the manufacturer may be paid more or less than the correct amount. When one considers the amount of carpet that is manufactured each year, it becomes apparent that the losses resulting from inaccurate length measurements can be extremely high.

A second problem results from the fact that carpet is generally made in long rolls. Assume, for example, that a manufacturer has a 200 foot roll of carpet in his warehouse. Assume also that a retailer or distributor desires a piece of carpet which is 50 feet long. The manufacturer will cut a 50 foot piece of carpet off the roll for the distributor or retailer. He has, however, created a serious problem for himself. The manufacturer now has less than a full roll of carpet and would like to be able to record its length for future use. In this regard, it has been suggested to use a measuring strip of paper or other material having numbered linear units thereon and rolling such strip of paper with the carpet. However, because of the expense of rolling such a measuring strip with the carpet and because of the inaccuracy of such strips, such strips are generally not used. The other alternative is to indicate, on a tag, the length of the remaining carpet and attach such a tag to the roll. However, such tags are often lost such that the quantity contained in the roll can only be ascertained by unrolling and remeasuring the entire length of carpet. Such an operation requires a considerable amount of labor and results in the waste of a considerable amount of time. Furthermore, it is difficult, if not impossible, to obtain an accurate indication of the length of a long piece of carpet by hand methods.

It has also been proposed to periodically print, on a strip of material, a linear unit which is indicative of the length of the material from the beginning thereof. For example, U.S. Pat. No. 615,406, issued Dec. 6, 1898 to George Newsum for Apparatus for Measuring and Marking Lengths on Fabrics, discloses a mechanism arranged to automatically measure and register on fabrics and like materials the length of same and to divide each standard of length marked thereon into any number of divisions and to provide means for imparting at intervals on the fabric a number indicating the length thereof. The material is used to rotate a large cylinder which supports two endless chains, one chain carrying even numbers and the other chain carrying odd numbers. The chains are mounted upon sprocket wheels around which they are rotated intermittently by means of pawls operated by a stationary cam. In this manner, each of the chains is moved the space from one figure or set of figures to another upon each revolution of the cylinder.

U.S. Pat. No. 1,371,373, issued Mar. 15, 1921 to Robert R. Hughes Jr. for Fabric Marking Device, discloses a rotating measuring roll which is driven by a length of fabric and which operates a marker for placing a mark on the fabric indicating the length thereof. The apparatus further includes a counting wheel including connected ratchet wheels, a pawl for each ratchet wheel, the pawls being disposed so as to turn the ratchet wheels in opposite directions, means for shifting the pawls so as to turn the counting wheel first in one direction and then the other, a marker, and means actuated by the counting wheel for operating the marker at predetermined intervals.

U.S. Pat. No. 2,478,139, issued Aug. 2, 1949 to Clinton Trosper for Indexing Means for Fabric Length Markers, includes a printing wheel having numerals formed thereon, the printing wheel being driven by a ratchet mechanism.

U.S. Pat. No. 1,677,927, issued July 24, 1928 to Allen D. Pettee for Cable Marking Machine, discloses a cable marking machine in which a pair of printing heads are periodically actuated to impress measurement marks on opposite sides of a cable. Actuation of the printing heads is achieved through a mechanism including a solenoid controlled by an electromagnetic relay switch driven by a timing wheel driven by the cable.

U.S. Pat. No. 553,895, issued Feb. 4, 1896 to Richard C. Borchers et al for Machine for Measuring and Marking Fabrics, discloses apparatus in which a printing wheel is driven synchronously with the moving material by a complex mechanical structure including belts and pulleys which require continued calibration. Other devices are disclosed in U.S. Pat. Nos. 1,096,249, 2,152,833, 321,393, 2,639,508, and 2,387,867 to Kessler, Aeschbach, Smith et al, Bates, Jr. et al, and Adams.

All of the above mentioned patents are characterized by an endless type of printing mechanism which includes a relatively complex mechanical drive arrangement in which continued movement of the material to be printed causes intermittent motion of the printing mechanism and periodic movement of the printing mechanism into contact with the material to be marked. The fundamental difficulty with such an approach is that accuracy of measurement and printing is a function of the ability of the mechanical coupling to accurately index the printing mechanism and to accurately and periodically bring the printing mechanism into contact with the material being measured and marked. This is inherently difficult to do with any great degree of accuracy and one of the primary reasons why none of the prior art devices have been successfully marketed.

A third problem arises from the fact that a run of carpet may result in several rolls of first quality carpet as well as one or more rolls of second quality carpet. Very often, a retainer purchases a roll of first quality carpet and a roll of second quality carpet from the same run. Naturally, the retailer pays considerably more for the first quality carpet than for the second quality carpet. Unfortunately, however, the rolls of carpet are often mistaken and the manufacturer is accused of providing second quality carpet as first quality carpet and is requested to refund the difference in prices. The difficulty is that the manufacturer is unable, by inspecting the carpet, to determine whether it was sold as first quality goods or second quality goods.

A related problem arises from present Federal Trade Commission regulations which require a manufacturer to identify the fiber content of all carpet sold both on the invoice and physically on the merchandise. The retailer has a similar requirement. Presently, compliance with these regulations is achieved through the use of tags attached to the carpet. However, as before, such tags are easily lost.

In addition to the problems encountered by the manufacturer, one of these problems is also encountered by the retailer. More specifically, the retailer is constantly faced with the problem of selling less than a complete roll of carpet and having to have some indication of the length of the remaining carpet. The only tools presently available to the retailer for indicating the remaining length of a roll of carpet are the same as the tools available to the manufacturer and, as indicated above, such tools are ineffective and not widely used.

Another problem encountered by the retailer is keeping track of the direction of the carpet pile. In other words, when carpet is layed, each piece must be positioned with the pile in the same direction. If one piece is turned by 90° or 180° relative to another piece, the result is a carpeted area which looks like it is made from several different pieces of carpet rather than from a single piece.

SUMMARY OF THE INVENTION

According to the present invention, there is provided an improved apparatus for measuring and marking, in numbered linear units, the length of a roll of carpet or other material. The present apparatus provides a positive and accurate measurement of the length of material in the roll, with very little error. According to the present apparatus, the complex mechanical constructions of the prior art together with their inherent inaccuracies are completely eliminated by the use of a tape having a finite length which is always equal to or greater than the length of the material to be measured, the opposite ends of the tape being rolled on a pair of spools and the tape being driven directly by and with the material as the material passes by the measuring apparatus. By periodically marking the length of the carpet from the beginning of the roll, both the manufacturer and the retailer will, at all times, know exactly how much carpet remains in the roll. In addition, by placing the markings on one edge of the carpet, the retailer may use the markings to keep track of the pile direction. Finally, at the same time that the length of the carpet is marked thereon, identifying data may also be marked on the carpet so that the manufacturer will be able to determine, simply by inspecting the carpet, what it is and whether it is first quality or second quality. Such markings will also satisfy, in a permanent manner, the FTC regulations pertaining to identifying the fiber content on the merchanidise.

Briefly, the operation of the apparatus consists of periodically printing, on the back side of a roll of material, a linear unit which is indicatve of the length of the material from the beginning of the roll. Such printing is achieved through the use of a sensing wheel mounted on an axis so as to be rotatable thereabout, the material being conducted past the wheel in intimate contact with the periphery thereof so that the material rotates the weel about the axis as the material passes the wheel. An elongated tape having linear units indicated thereon by cutting perforations therein to form a stencil is positioned with one side thereof in contact with the back side of the material. The linear units are spaced along the tape from a starting point by an amount equal to the distance the units represent from the starting point and the tape has a finite length which is always equal to or greater than the length of the material to be measured. Means are provided for driving the tape with the material as the material is conducted past the sensing wheel. Therefore, by use of an inked roller in contact with the other side of the tape, the linear units on the tape may be transferred to the back side of the material.

At the start of a measurement, the tape is brought into contact with the material and, as the material is being driven, the tape is driven therewith. Since the sensing wheel positively engages the material and drives the tape therewith, there is no slipping of the tape relative to the material. Therefore, as long as the tape is originally constructed accurately, it is inherently possible and quite practical to measure the length of a roll of material accurately and reliably.

The tape has a series of sprocket holes spaced longitudinally therealong and, according to a first embodiment of the invention, the teeth on the sensing wheel extend through the sprocket holes in the tape and drive the tape with the material as the material is conducted past the sensing wheel. According to a second embodiment of the invention, the tape is driven by a servo motor which is interconnected with the sensing wheel and follows the rotation thereof. The use of a servomechanism between the sensing wheel which contacts the material and the tape driving servo motor isolates the tape from the forces exerted thereon by the material.

Finally, by providing one or more additional inked rollers having identifying information thereon, such identifying information can simultaneously be printed on the back side of the material so that it will be possible, simply by inspecting the material, to determine the fiber content, the pattern name, number or color, the manufacturer's roll number, etc.

OBJECTS

It is, therefore, an object of the present invention to provide an apparatus for measuring and marking, in numbered linear units, the length of a roll of carpet or like material.

It is a further object of the present invention to provide an apparatus for marking the length of a roll of carpet or other material by periodically printing, on the back side thereof, a linear unit which is indicative of the length of the material.

It is still a further object of the present invention to provide apparatus for positively and accurately measuring the length of a roll of carpet or other material.

It is another object of the present invention to provide apparatus including an elongated stencil for periodically printing a linear unit on the back side of a roll of material, such linear unit indicating the length of the material.

It is still another object of the present invention to provide measuring and marking apparatus for a roll of material including an elongated stencil having a finite length which is always equal to or greater than the length of the material to be measured, the stencil being driven directly by and with the material as the material passes by the measuring apparatus.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BREIF DESCRIPTION OF THE DRAWINGS

DESCRIPTION OF THE PREFERRED EMBODIMENTS

Figure 1:
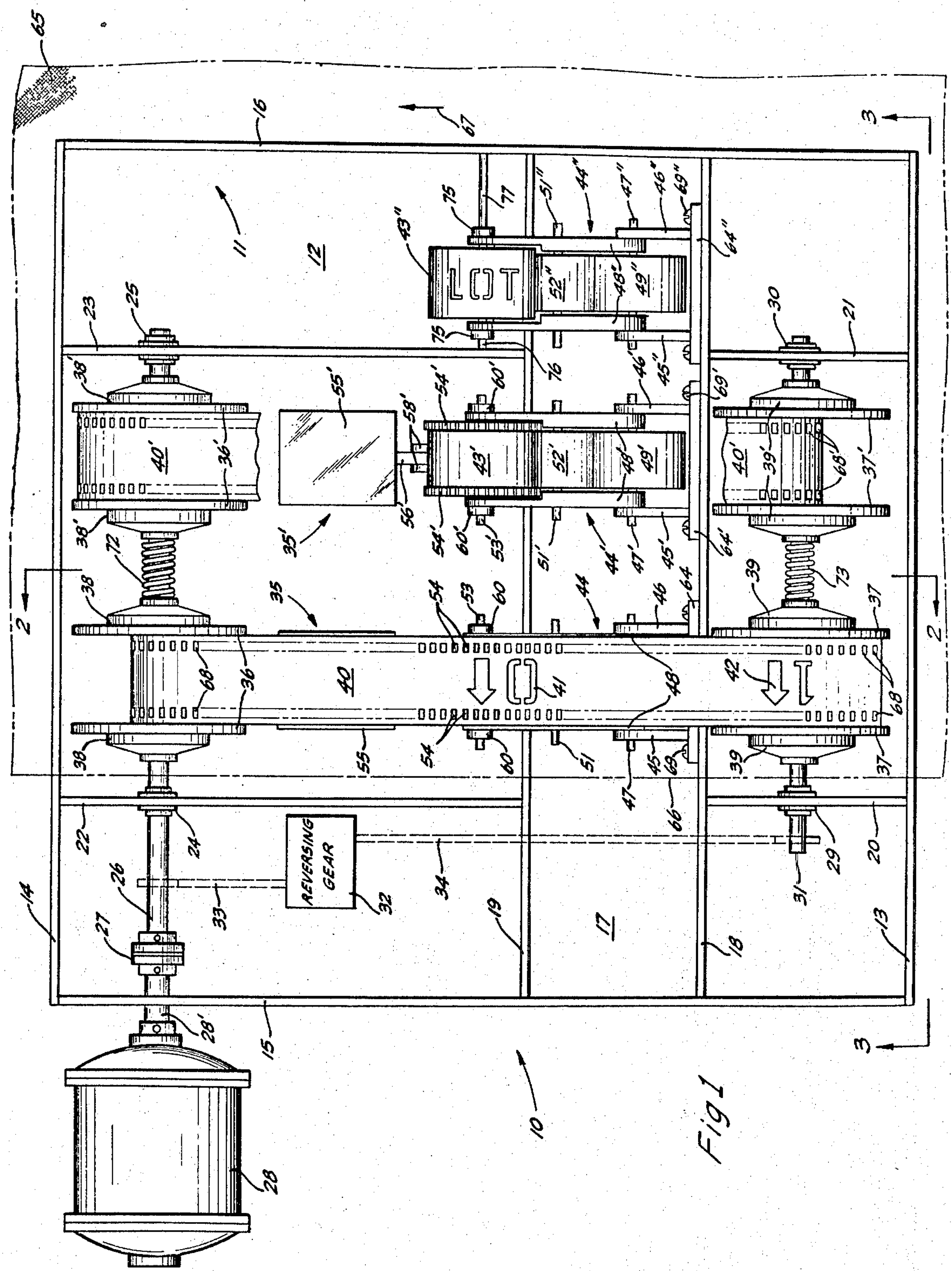
FIG. 1 is a top plan view of a first embodiment of apparatus for periodically printing, on the back side of a roll of material, linear units which are indicative of the length of the material, and also for periodically printing on such material identifying data.
Figure 2:
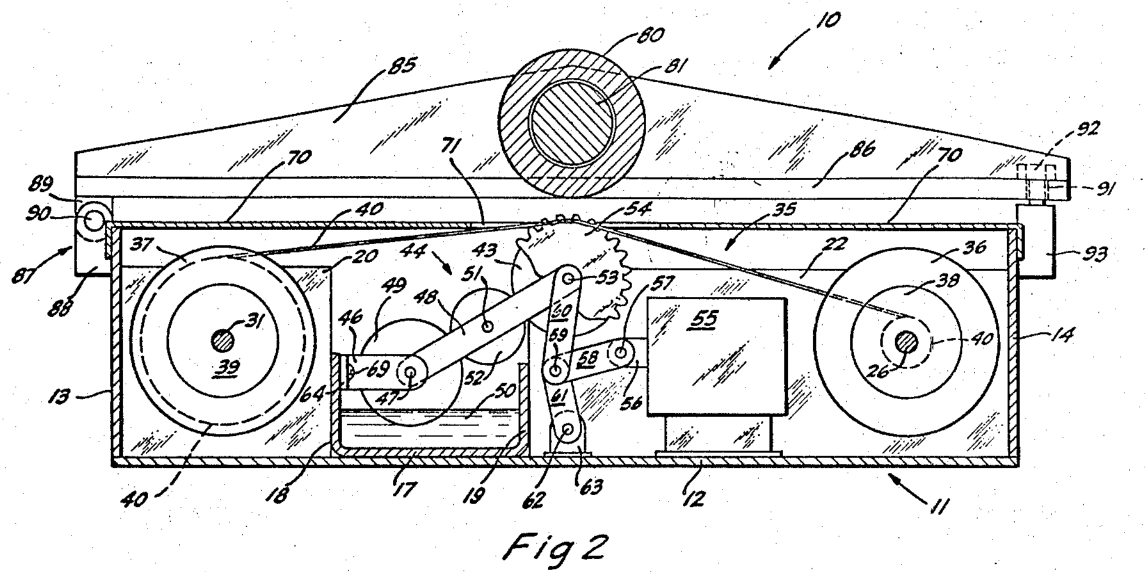
FIG. 2 is a slightly reduced view of the apparatus of FIG. 1 taken along the line 2—2 in FIG. 1.
Figure 3:
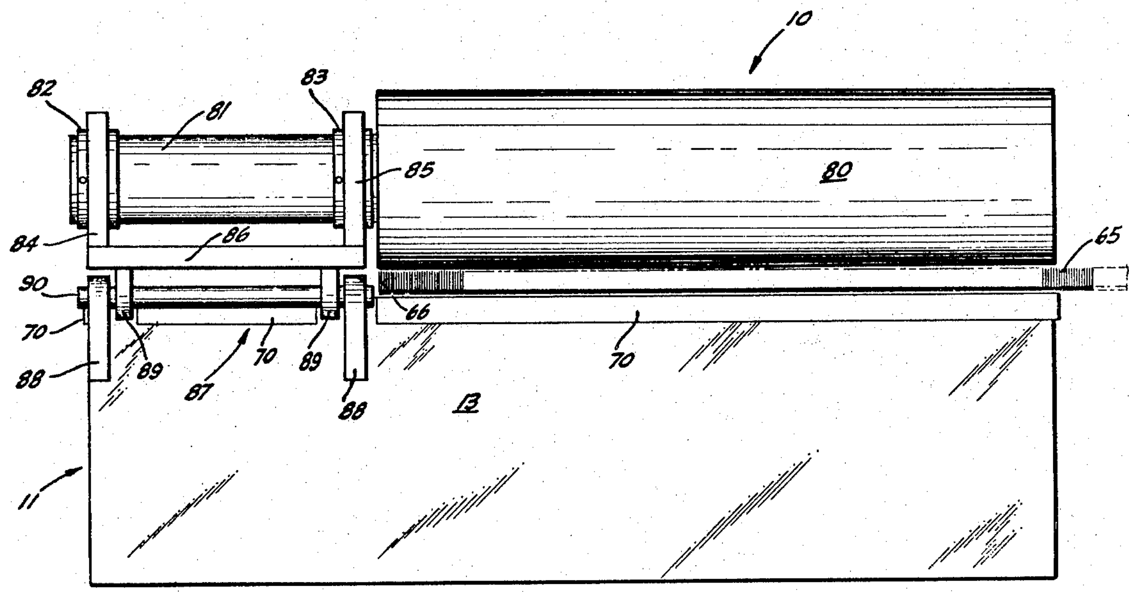
FIG. 3 is a view taken along the line 3—3 in FIG. 1.

Referring now to the drawings and, more particularly, to FIGS. 1–3 thereof, there is shown a first embodiment of apparatus, generally designated 10, for measuring the length of a roll of carpet or like material and for periodically printing, on the back side thereof, identifying markings as well as linear units which are indicative of the length of the material from the beginning of the roll. Apparatus 10 includes a generally rectangular housing 11, having a base 12, front and rear walls 13 and 14, respectively, and side walls 15 and 16, all of walls 13–16 having the same height. Secured to base 12 of housing 11 and extending from wall 15 to wall 16, parallel to walls 13 and 14, is a U-shaped trough 17 having side walls 18 and 19. A pair of spaced, vertical support walls 20 and 21 are positioned between wall 18 of trough 17 and wall 13 of housing 11. In addition, a similar pair of spaced, vertical support walls 22 and 23 are positioned between wall 19 of trough 17 and wall 14 of housing 11.

Support walls 22 and 23 rotatably support, via bearings 24 and 25, respectively, a first rotaable shaft 26. Shaft 26 is connected by a coupling 27 to a motor 28 which is positioned externally of housing 11 and which has a shaft 28' which extends through side wall 15 of housing 11 to join with coupling 27. In this manner, motor 28 is operative to rotate shaft 26 in a clockwise direction, as viewed in FIG. 2

Support walls 20 and 21 rotatably support, via bearings 29 and 30, respectively, a second rotatable shaft 31. A reversing gear 32 is operatively connected via conventional belts, chains, or other mechanical means 33 and 34 between shafts 26 and 31, respectively, so that motor 28 is further operative to rotate shaft 31 in a counter-clockwise direction, as views in FIG. 2.

Shafts 26 and 31 are operatively associated with first and second printing mechanisms 35 and 35'. Printing mechanisms 35 and 35' are in all resepcts identical, such that a description of the elements and operation of one will completely suffice to describe the elements and operation of the other. Therefore, corresponding elements of printing mechanisms 35 and 35' have been assigned the same numerals, with the addition of a prime to the numerals associated with printing mechanism 35'. The reason for having two identical printing mechanisms will become more apparent hereinafter.

Printing mechanism 35 comprises first and second spools 36 and 37 which are mounted on, but not connected to, shafts 26 and 31, respectively, so that spools 36 and 37 may rotate independently of shafts 26 and 31. On the other hand, spools 36 and 37 may be driven by shafts 26 and 31, respectively. through the operation of first and second pairs of friction drives 38 and 39, which are connected to shafts 26 and 31, respectively, but are only in frictional contact with spools 36 and 37, respectively. Accordingly, and depending upon other factors to be explained more fully hereinafter, friction drives 38 are adapted to rotate spool 36 in a clockwise direction, as viewed in FIG. 2, and friction drives 39 are adapted to rotate spool 37 in a counter-clockwise direction, as viewd in FIG. 2.

Connected between spools 36 and 37 is a thin, elongated tape 40 which will have a finite length which is always at least as long as the length of the longest roll of material to be measured. Tape 40 is perforated, as at 41 and 42, to operate as a stencil. The perforations are in the form of linear units which indicate the length of tape 40 from a given starting point. In other words, if it is desired to print on the back side of a piece of material linear units indicative of the number of feet in a roll of material, perforation 41 defines the starting point and includes the number "0" together with an arrow, perforation 42 is 1 foot from perforation 41 and includes the number "1" and an arrow, and the remainder to tape 40 will have, every foot, an additional perforation which consists of the next consecutive number. By positioning an inked roller 43 directly beneath tape 40 and in contact therewith and by positioning a piece of material on top of tape 40 and in contact therewith, tape 40 may operate as a stencil to print the linear units on such material. For this purpose, each of printing mechanisms 35 and 35' include identical inking mechanisms 44 and 44'.

Inking mechanism 44 includes first and second spaced brackets 45 and 46, one end of each bracket is secured to a second bracket 64 which is secured to side wall 18 of trough 17 by screws 69. The other end of each of the brackets 45 and 46 support an axle 47 which rotatably supports the ends of a first pair of identical linkages 48 and a first roller 49 which extends below brackets 45 and 46 into trough 17. In addition, trough 17 is filled with an ink solution 50 whereby a portion of roller 49 is, at all times, immersed in ink solution 50.

Supported midway between the ends of linkages 48 is a second axle 51 which rotatably supports a transfer roller 52, the surface of which is in contact with the surface of roller 49. The other ends of linkages 48 support a third axle 53 which rotatably supports the beforementioned roller 43, the surface of which is in contact with the surface of roller 52. Axle 53 also rotatably supports a pair of identical toothed sensing wheels 54 which are fixedly connected to the opposite sides of roller 43 to rotate therewith.

Linkages 48 may be rotated about axle 47 to raise and lower roller 43 and sensing wheels 54 by a solenoid switch 55 secured to base 12 of housing 11. Solenoid 55 has an output shaft 56 which is connected via a pin 57 to the ends of a pair of linkages 58. The other ends of linkages 58 are connected via a pin 59 to the ends of a first pair of linkages 60 and a second pair of linkages 61. The other ends of linkages 60 are connected to axle 53, whereas the other ends of linkages 61 are connected via a pin 62 to a bracket 63 secured to base 12 of housing 11.

In operation, apparatus 10 may be used to measure the length of a piece of material and to periodically print, on one side thereof, linear units which are indicative of its length. More specifically, and by way of example, a piece of carpet 65 may be placed with one side edge 66 positioned as shown in FIGS. 1 and 3 so that carpet 65 is moving in the direction of arrow 67. Carpet 65 would initially be positioned with its back side in contact with tape 40 and with the leading edge thereof aligned with the arrow at 41. Assuming that printing mechanism 35 is, at this time, operative and printing mechanism 35' is inoperative, solenoid 55 would be actuated to position shaft 56 as shown in FIG. 2 where roller 43 and wheels 54 are in the up position. The teeth on wheels 54 extend through sprocket holes 68 which are spaced along the side edges of tape 40 and have the same appearance as the sprocket holes on a roll of photographic film. The spacing between the two rows of sprocket holes 68 is equal to the spacing between wheels 54 and the pitch of sprocket holes 68 is equal to the pitch of the teeth on wheels 54 so that the teeth on wheels 54, at all times, extend through sprocket holes 68. Furthermore, at this time, solenoid 55' has been actuated to extend shaft 56' outwardly, to the left, as viewed in FIG. 2. When this occurs, linkage 61' rotates about pin 62' pulling linkage 60' downwardly and rotating linkage 48' clockwise, as viewed in FIG. 2.

Under these circumstances, the teeth on wheels 54 and tape 40 engage the back of carpet 65 whereas the teeth on wheels 54' and tape 40' do not contact the back of carpet 65. This is guaranteed by providing the top of housing 11 with a cover 70 which completely encloses housing 11 except for first and second rectangular openings 71 and 71' which extend for short distances on all four sides of wheels 54 and 54', respectively.

Carpet 65 proceeds through apparatus 10 with the back side thereof resting on cover 70 of housing 11. With solenoid 55 in the position shown in FIG. 2, the teeth on wheels 54 extend through opening 71 in cover 70 and the surface of roller 43 extends slightly above the top surface of cover 70. With solenoid 55' in the other position, wheels 54' and roller 43' have been lowered to the point where the teeth on wheels 54' do not extend into opening 71' in cover 70. Acfordingly, at this time, as carpet 65 is driven by a conventional apparatus 200 through apparatus 10 in the direction of arrow 67, sensing wheels 54 will be driven due to the positive contact between the teeth thereon and the back side of carpet 65 and sensing wheels 54' will not be driven due to the lack of contact between the teeth thereon and the back side of carpet 65. Furthermore, as carpet 65 is driven through apparatus 10, wheels 54 drive tape 40 in the direction of spool 36.

At this time, friction drives 38 are trying to rotate spool 36 in a clockwise direction whereas firction drives 39 are trying to rotate spool 37 in a counterclockwise direction. Since wheels 54 are driving tape 40 towards spool 36, friction drives 38 are not opposed by wheels 54 and tape 40 is wound onto spool 36. Under these circumstances, the only function of friction drives 39 is to keep tape 40 taut.

In this manner, tape 40 is driven with carpet 65 in a positive and accurate manner so that the length of tape 40 which passes wheels 54 is equal to the length of carpet 65 which passes wheels 54. Wheels 54, which are attached to roller 43, cause roller 43 to rotate in contact with the back surface of tape 40. Since roller 43 is in contact with roller 52, the rotation of roller 43 causes roller 52 to rotate. Furthermore, since the surface of roller 52 is in contact with the surface of roller 49, the rotation of roller 52 causes roller 49 to rotate. The end result is that roller 49 is rotated through ink solution 50 in trough 17, which ink solution 50 adheres to roller 49 and is transferred via roller 52 to roller 43. Therefore, every time a perforation in tape 40, as at 41 and 42, passes above roller 43, the ink on roller 43 is transferred through the perforations to the back side of carpet 65.

Accordingly, as carpet 65 passes through apparatus 10, linear units defined by the perforations in tape 40 are printed on the back of carpet 65. Since sensing wheels 54 positively engage the back surface of carpet 65, there is no slipping and an accurate measurement of the length of the carpet is stamped thereon with a degree of accuracy which is as great as the accuracy with which stencil 40 is made.

If the manufacturer desires to record the amount of material passing through apparatus 10, sensing wheels 54 and 54' may be used to provide a mechanical or electrical output which is an accurate indication of the length of the carpet. Such output may be applied to a first counter which is reset every time solenoids 55 and 55' are actuated. Such a counter may be used to print out the length of each roll of carpet. Such output may also be applied to a second counter which may be used to record the total amount of carpet passing through apparatus 10. Many methods for deriving a mechanical or electrical output indicative of the rotation of sensing wheels 54 and 54' will be apparent to those skilled in the art.

Carpet generally comes out of a manufacturing machine at such a rate that the beginning of a new roll of carpet immediately follows the end of the previous roll. However, with the present apparatus, when carpet 65 comes to the end of the roll, tape 40 will be wound up on spool 36 and the perforation should read 100, 200, or more feet. Therefore, before another roll of carpet can be marked, tape 40 must be rewound onto spool 37. To prevent a time delay which would be required to rewind tape 40, identical printing mechanisms 35 and 35' have been provided. In other words, during the time that printing mechanism 35 is operating, printing mechanism 35' is rewinding tape 40' onto spool 37' so that it will be ready to mark linear units on the back of the next roll of carpet. The rewinding procedure is as follows:

FIG. 1 shows the condition of apparatus 10 for a situation where printing mechanism 35' has just ceased operation and tape 40' is wound onto spool 36' and where tape 40 is wound onto spool 37 ready to commence operation. To reverse the operation, solenoids 55 and 55' are activated to elevate wheels 54 and to lower wheel 54', respectively. When wheels 54' are lowered and are no longer in contact with carpet 65, friction drives 39' are trying to rewind spool 37' whereas friction drives 38' are trying to continue to wind spool 36'. Accordingly, springs 72 and 73 are positioned around shafts 26 and 31, respectively, spring 72 being operative to adjust the frictional force of friction drives 38 and 38' and spring 73 being operative to adjust the frictional force of friction drives 39 and 39'. Therefore, by making spring 73 stronger than spring 72, the friction drives may be adjusted so that friction drives 39 will always prevail over friction drives 38 and friction drives 39' will always prevail over friction drives 38'. As a result, as soon as the teeth on wheels 54' are lowered out of contact with the back of carpet 65, friction drives 39' cause spool 37' to rotate in a counter-clockwise direction to completely rewind tape 40'. However, as explained previously, when wheels 54' are in their uppermost position, in contact with the back surface of carpet 65, wheels 54' control the direction that tape 40' is wound and friction drives 39' are not permitted to overcome the effect of friction drives 38'.

As discussed previously, it would be of further advantage to be able to print identifying markings on the back side of carpet 65 at the same time that the linear units are being printed thereon. According to the present invention, this may be done by providing one or more additional inking mechanisms 44'' (only one being shown in FIG. 1) which are very much similar to inking mechanisms 44 and 44'. The elements of inking mechanism 44'' which are identical to the elements of inking mechanisms 44 and 44' include brackets 45'', 46'', and 64'', axles 47'' and 51'', linkages 48'' and rollers 49'', 52'', and 43''. Since roller 43'' will be in contact with the back of carpet 65 at all times, linkages 60, 61, and 58 of inking mechanism 44 are replaced with a single pair of linkages 75 which are secured directly to base 12 of housing 11. Furthermore, since no stencil is associated with roller 43'', wheels 54 are eliminated. Instead, roller 43'' may be supported for rotation about axles 76 and 77, one of which may be movable to permit removal of roller 43'' from between linkages 48''. In addition, roller 43'' may actually be in the form of a rubber stamp having raised portions which are capable of identifying the carpet. Therefore, with roller 43'' positioned on axles 76 and 77 and extending through an opening 71'' in cover 70, and with roller 49'' partially submerged in ink solution 50 in trough 17, such ink solution will be transferred via rollers 49'' and 52'' to roller 43'' which may then operate to continuously print such identifying information on the back side of carpet 65 as it passes through apparatus 10. Such information may include the fiber content, the pattern name, number and/or color, the manufacturer's roll number, etc.

With reference to FIGS. 2 and 3, apparatus 10 further includes means for exerting pressure on the top of carpet 65 as it passes therethrough to insure positive engagement between the teeth on wheels 54 and 54' and roller 43'' and the back of carpet 65 to prevent slipping of one relative to the other. Such apparatus may include an elongated roller 80 which is rotatably mounted on an axle 81 which is secured at one end thereof via means 82 and 83 to a pair of vertical support plates 84 and 85, respectively. Support plates 84 and 85 are mounted along the sides of a horizontal support plate 86. One end of plate 86 is secured to front wall 13 of housing 11 by means of a hinge assembly 87. Hinge assembly 87 includes bracket members 88 which are connected to front wall 13 of housing 11 and bracket members 89 which are connected to one end of support plate 86. Bracket members 88 and 89 are connected by a pin 90 which permits rotation of support plates 84–86 about pin 90. The other end of support plate 86 has a hole 91 therein, through which a bolt 92 extends. Bolt 92 is adapted to be screwed into a receptacle 93 which is secured to rear wall 14 of housing 11.

In operation, by unscrewing bolt 92 from receptacle 93, support plates 84–86 and roller 80 may be elevated, being rotated about pin 90. Carpet 65 may then be placed over cover 70 on housing 11 with side edge 66 positioned as shown in FIG. 3. Roller 80 is then swung downwardly and bolt 92 is screwed into receptacle 93. Roller 80 is supported by support plates 84 and 85 in such a manner that it contacts the top surface of carpet 65 immediately above rollers 43, 43', and 43''. By adjusting the torque on bolt 92, the downward pressure exerted by roller 80 on carpet 65 may be adjusted to a point where there is no slipping between wheels 54 and 54' and roller 43'' and carpet 65.

It will be apparent to those skilled in the art that apparatus 10 represents but a single embodiment of the present means for periodically printing, on the back side of a roll of material, a linear unit which is indicative of the length of the material from the beginning of the roll. In its broadest aspects, the present apparatus utilizes an elongated tape having linear units indicated thereon by cutting perforations therein to form a stencil, the linear units being spaced along the tape from a starting point by an amount equal to the distance the units represent from the starting point, the tape having a finite length which is always equal to or greater than the length of the material to be measured. The opposite ends of the tape are wound on spools and the tape is selectively positioned with one side thereof in contact with one side of the material, the other side of the tape contacting an inking means for passing ink through the perforations. A sensing wheel rotated by the material is utilized to drive the tape with the material, in contact therewith, as the material is conducted past the sensing wheel. Such apparatus permits complete elimination of the relatively complex mechanical drive arrangements of the prior art in which continued movement of the material causes intermittent motion of a printing mechanism and periodic movement of the printing mechanism into contact with the material to be marked. With the present apparatus, as long as the tape is originally constructed accurately and as long as the tape is moved synchronously with the material, it is inherently possible and quite practical to measure the length of a roll of material accurately and reliably.

It will, however, be apparent to those skilled in the art that various modifications and improvements may be made to apparatus 10 without departing from the principals embodied in such apparatus. More specifically, and referring now to FIG. 4, there is shown a second embodiment of apparatus, generally designated 100, for measuring a length of a roll of carpet or like material and for periodically printing, on the back side thereof, linear units which are indicative of the length of the material from the beginning of the roll. Apparatus 100 is identical in concept and quite similar in structure to apparatus 10 in that there is included: first and second identical printing mechanisms 135 and 135', printing mechanism 135 comprising first and second spools 136 and 137 mounted on shafts 126 and 131, respectively, a thin, elongated tape 140 perforated to operate as a stencil, and an inking mechanism 144 contacting one side of tape 140 for passing ink through the perforations for printing linear units on one side of a roll of material; a sensing wheel 154 mounted on an axle 153 so as to be freely rotatable thereabout, wheel 154 being positioned to contact the material and be rotated thereby; and identical drive means 110 and 110', each cooperating with sensing wheel 154 to drive tapes 140 and 140' with the material as the material is conducted past wheel 154. As will be explained more fully hereinafter, the primary difference between apparatus 100 and apparatus 10 is the manner in which sensing wheel 154 is utilized to drive tapes 140 and 140'. the Generally speaking, in apparatus 10, sensing wheels 54 engage both carpet 65 and tape 40. This being the case, the force exerted on wheel 54 by carpet 65 is partially resisted by the force exerted on wheel 54 by tape 40 because of the mass thereof and the effects of spools 36 and 37 and friction drives 38 and 39. In other words, carpet 65, when operating to rotate sensing wheel 54, must not only overcome the mass thereof, but must also overcome the forces placed thereon by tape 40 and its associated structures. Under some circumstances, these forces tending to prevent rotation of sensing wheels 54 do not adversely affect the operation of apparatus 10. However, it may be desirable to isolate sensing wheels 54 from these forces. This is achieved with apparatus 100 where a conventional servo system, generally designated 101, is positioned between sensing wheel 154 and tapes 140 and 140'.

As will be described more fully hereinafter, servo system 101 includes a master encoder 102 for sensing the angular position of sensing wheel 154 and for generating a first electrical signal on a line 103 representative of to the angular position of the wheel 154, drive wheels 104 and 111 and drive wheels 104' and 111' for driving tapes 140 and 140', respectively, a servo motor 105 for driving wheels 104 and 111 or wheels 104' and 111', a slave encoder 106 for sensing the angular position of drive wheels 104, 104', 111, and 111' and for generating a second electrical signal on a line 107 representative of the angular positions of the drive wheels, and a servo control circuit 108 responsive to the electrical signals on lines 103 and 107 for actuating servo motor 105 to cause drive wheels 104 and 111 or 104' and 111' to follow sensing wheel 154 whereby tape 140 or 140' moves with the material in contact with sensing wheel 154.

More specifically, apparatus 100 includes a suitable housing, not shown, of the type described previously with respect to apparatus 10 for supporting the structure to be described hereinafter. Since apparatus 100 represents a modification of and an improvement to apparatus 10, not all of the structure previously described will be repeated hereat.

Apparatus 100 includes shafts 126 and 131 which correspond in structure and function to shafts 26 and 31, respectively, of apparatus 10. Shaft 126 is connected to a motor 128 which is operative to rotate shaft 126 in a counter-clockwise direction, as viewed in FIG. 4. Shaft 131 is operatively connected via a reversing gear 132 and conventional belts, chains or other mechanical means 133 and 134 to shaft 126 so that motor 128 is further operative to rotate shaft 131 in a clockwise direction, as viewed in FIG. 4. Shafts 126 and 131 are operatively associated with first and second printing mechanisms 135 and 135' which are in all respects identical, such that a description of the elements and operation of one will completely suffice to describe the elements and operation of the other. Therefore, corresponding elements of printing mechanisms 135 and 135' have been assigned the same numerals, with the addition of a prime to the numerals associated with printing mechanism 135'. The reason for having two identical printing mechanisms in apparatus 100 is the same as described previously with respect to apparatus 10.

Printing mechanism 135 comprises spools 136 and 137 which are mounted on, but not connected to, shafts 126 and 131, respectively, so that spools 136 and 137 may rotate independently of shafts 126 and 131. On the other hand, spools 136 and 137 may be driven by shafts 126 and 131, respectively, through the operation of first and second clutches 138 and 139 which are connected to shafts 126 and 131, respectively, and are adapted to engage spools 136 and 137, respectively. When engaged, clutch 138 is adapted to rotate spool 136 in a counter-clockwise direction, as viewed in FIG. 4, and clutch 139 is adapted to rotate spool 137 in a clockwise direction, as viewed in FIG. 4. Clutches 138 and 139 need not be friction devices of the type which are always engaged as described with respect to apparatus 10. Alternatively, clutches 138 and 139 may be of the type which is selectively engaged or disengaged in response to an electrical signal, as will be explained more fully hereinafter.

Connected between spools 136 and 137 is a stencil tape 140 which is identical to tape 40 described previously with respect to apparatus 10. Tape 140 includes perforations in the form of linear units which indicate the length of tape 140 from a given starting point, tape 140 having a finite length which is always equal to or greater than the length of the longest roll of material to be measured. By positioning an inked roller 143 directly beneath tape 140 and in contact therewith and by positioning a piece of material on top of tape 140 and in contact therewith, tape 140 operates as a stencil to print the linear units on such material. For this purpose, printing mechanisms 135 and 135' include identical inking mechanisms 144 and 144', respectively.

Inking mechanism 144 may be identical to that described with reference to apparatus 10 and include a plurality of rollers and a trough having an ink solution therein for transferring ink to roller 143. However, according to the embodiment of FIG. 4, inking mechanism 144 includes a single inked roller 143, mounted for rotation in a U-shaped bracket 145, which receives a supply of ink via a conduit 146 which passes through bracket 145 and terminates internally of roller 143. By providing suitable O-ring gaskets, not shown, in a conventional manner, ink may be conducted via conduit 146 to constantly moisten roller 143, such ink traveling via centrifugal force to the surface of roller 143 where it passes through the perforations in tape 140. Other types of inking mechanisms will be apparent to those skilled in the art.

Tape 140 is conducted over the top of and in contact with the surface of roller 143 by a pair of guide rollers 147 and 148 mounted for movement with bracket 143 in any suitable manner. Bracket 145 may be activated to raise and lower roller 143 and tape 140 in any suitable manner such as by a solenoid switch 155 secured to the housing of apparatus 100. solenoid 155 has an output shaft 156 which is connected to bracket 145.

Apparatus 100 includes first and second identical drive means, generally designated 110 and 110', for driving tapes 140 and 140', respectively, from spools 137 and 137', respectively, to spools 136 and 136', respectively. Drive means 110 includes drive wheels 104 and 111, each of which includes two sets of teeth 109 which extend through sprockets holes 168 which are spaced along the side edges of tape 140, as explained previously with respect to apparatus 10. The spacing between the two sets of teeth 109 on drive wheels 104 and 111 is equal to the spacing between the two rows of sprocket holes 168 in tape 140 and the pitch of teeth 109 on wheels 104 and 111 is equal to the pitch of sprockets holes 168 so that teeth 109 on wheels 104 and 111, at all times, extend through sprocket holes 168. Drive wheel 104 is positioned adjacent spool 136, between a pair of guide rollers 112 and 113 which operate to warp tape 140 around drive wheel 104 through an angle of approximately 180°. Similarly, drive wheel 111 is positioned adjacent spool 137, between a pair of guide rollers 114 and 115 which operate to wrap tape 140 around drive wheel 111 through an angle of approximately 180°. Tape 140 is conducted by guide rollers 113 and 115 to guide rollers 147 and 148 which conduct tape 140 around inking roller 143. If desired, washing stations 116 may be positioned between guide rollers 113 and 147 and between guide rollers 115 and 148 to wash any excess ink from tape 140 as it leaves inking mechanism 144 and before it is wound on spools 136 and 137.

Drive means 110 and 110' further include a pair of shafts 117 and 118 which are supported via bearings, not shown, in any suitable manner. Shaft 117 is connected to servo motor 105 which is operative to rotate shaft 117 in a counter-clockwise direction, as viewed in FIG. 4. Shaft 118 is operatively connected via mechanical means 119 to shaft 117 so that motor 105 is further operative to rotate shaft 118 synchronously with shaft 117 in a counter-clockwise direction, as viewed in FIG. 4. Drive wheels 104 and 104' of drive means 110 and 110', respectively, are mounted on, but not connected to, shaft 117 and drive wheels 111 and 111' of drive means 110 and 110', respectively, are mounted on, but not connected to, shaft 118 So that drive wheels 104, 104', 111, and 111' may rotate independently of shafts 117 and 118. On the other hand, drive wheels 104 and 111 may be driven by shafts 117 and 118, respectively, through the operation of first and second clutches 120 and 121 which are connected to shafts 117 and 118, respectively. Clutches 120 and 121 are of conventional type and are adapted to be actuated by a suitable electrical signal to simultaneously connect drive wheels 104 and 111 to shafts 117 and 118, respectively. Alternatively, clutches 120' and 121' are adapted to be actuated by a suitable electrical signal to simultaneously connect drive wheels 104' and 111' to shafts 117 and 118, respectively. Accordingly, servo motor 105 is adapted to drive either drive wheels 104 and 111 or drive wheels 104' and 111' to drive tape 140 or 140' from spool 137 or 137' to spool 136 or 136'.

Figure 4:
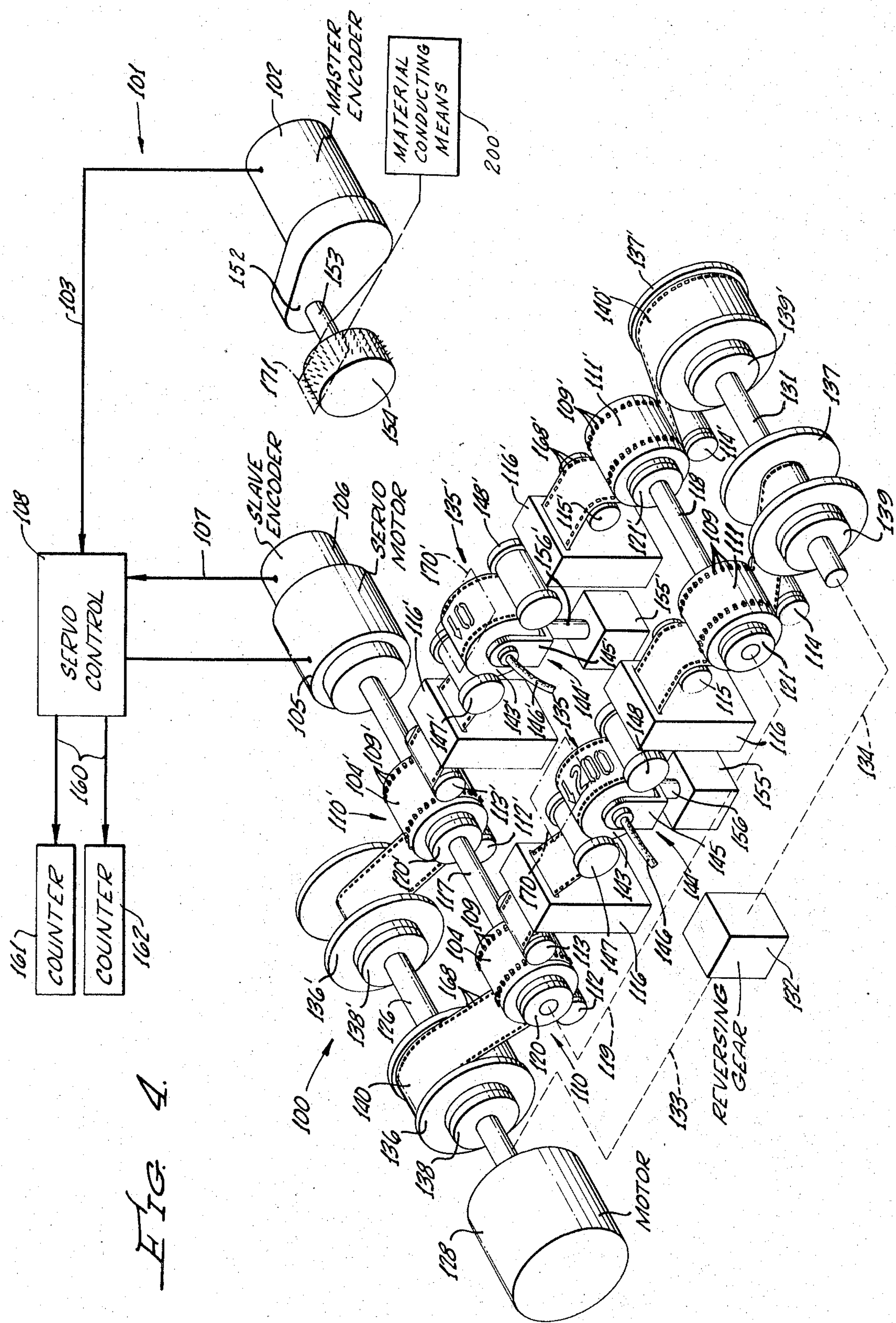
FIG. 4 is a schematic representation, shown in perspective, of a second embodiment of apparatus for periodically printing, on the back side of a roll of material, linear units which are indicative of the length of the material.

Since sensing wheel 154 no longer directly contacts tapes 140 or 140', it may be any of the well known types of friction driven members. Sensing wheel 154 may have a smooth periphery and have a pinch roller associated therewith or may have a plurality of pins or teeth extending from the periphery thereof, as shown in FIG. 4, to firmly contact and be driven by the carpet. Axle 153, on which wheel 154 is mounted, is connected to master encoder 102 by a suitable gear reduction mechanism 152 so that master encoder 102 directly senses the rotation of axle 153 and sensing wheel 154. Master encoder 102 generates a first electrical signal proportional to the angular position of sensing wheel 154, such signal being applied via line 103 to servo control circuit 108. Servo control circuit 108 also receives, via line 107, a second input from slave encoder 106 proportional to the angular position of drive wheels 104 and 111 or 104' and 111'. Servo control circuit 108 is a conventional electrical circuit which senses the difference between the angular positions of sensing wheel 154 and drive wheels 104, 104', 111, and 111' and operates to activate servo motor 105 to eliminate such angular difference. Servo systems of the type disclosed are well known to those skilled in the art and can be constructed so that drive wheels 104 and 111 or 104' and 111' accurately and closely follow the rotation of sensing wheel 154. Furthermore, by interposing servo system 101 between sensing wheel 154 and drive wheels 104, 104', 111, and 111', the forces placed on sensing wheel 154 to oppose the rotation thereof are substantially minimized thereby insuring accurate following of the carpet by sensing wheel 154 and tape 140 or 140' via servo system 101 and drive means 110 or 110'.

In operation, apparatus 100 may be used to measure the length of a piece of material and to periodically print, on one side thereof, linear units which are indicative of its length in essentially the same manner as described previously with respect to apparatus 10. More specifically, and by way of example, a peice of carpet may be placed as in apparatus 10 with its back side in contact with tape 140 or tape 140' and sensing wheel 154. Assuming that printing mechanism 135' is, at this time, operative and printing mechanism 135 is inoperative, solenoid 155' would be actuated to position shaft 156' as shown in FIG. 4 where bracket 145' and roller 143' are in the up position. Furthermore, at this time, solenoid 155 has been deactivated to withdraw shaft 156 so that roller 143 and bracket 145 are in the down position. In the embodiment of FIG. 4, sensing wheel 154 is always in the up position so that the periphery thereof engages the back of the carpet together with tape 140', tape 140 not contacting the back of the carpet at this time. This arrangement is guaranteed by providing the top of apparatus 100 with a cover, not shown, similar to cover 70 of apparatus 10, which completely encloses apparatus 100 except for first and second rectangular openings 170 and 170' which extend for short distances on all four sides of rollers 143 and 143', respectively, and a third rectangular opening 171 which extends for short distances on all four sides of sensing wheel 154.

A length of carpet proceeds through apparatus 100 in the same manner that carpet 65 proceeds through apparatus 10. With solenoid 155' in the position shown in FIG. 4, the surface of roller 143' extends through opening 170' to contact the back side of the carpet. With solenoid 155 in the other position, roller 143 and tape 140 have been lowered to the point where they do not extend into opening 170. Accordingly, at this time, as the carpet is driven by external apparatus (not shown) through apparatus 100, sensing wheel 154 will be driven due to the positive contact between the teeth thereon and the back side of the carpet. Also at this time, clutches 120' and 121' would be engaged and clutches 120 and 121 disengaged so that servo motor 105 drives drive wheels 104' and 111' and tape 140' with the carpet. Also at this time, clutch 138' would be engaged and clutch 139' disengaged so that spool 136' is driven in a counter-clockwise direction to wind tape 140' thereon. Under these circumstances, there would be a slight amount of friction between spool 137' and shaft 131 which would be sufficient to keep tape 140' taut. In any event, because of the inclusion of a pair of drive wheels 104' and 111', tape 140' is maintained taut at the point where it contacts the back side of the carpet and inked roller 143' insuring a good contact with the back side of the carpet and an accurate printing operation.

In this manner, tape 140' is driven with the carpet in a positive and accurate manner so that the length of tape 140' which passes roller 143' is equal to the length of carpet which passes sensing wheel 154. Tape 140', which is wrapped around roller 143' by guide rollers 147' and 148' and which is positively driven by drive wheels 104' and 111', causes roller 143' to rotate in contact with the back surface thereof. Ink is supplied internally of roller 143' by conduit 146' and flows under the influence of centrifugal force to the surface thereof. Therefore, every time a perforation in tape 140' passes over roller 143, the ink on roller 143' is transferred through the perforation to the back side of the carpet.

Accordingly, as carpet passes through apparatus 100, linear units defined by the perforations in tape 140' are printed on the back side thereof. Since sensing wheel 154 positively engages the back surface of the carpet and positively drives tape 140' via servo system 101 and drive means 110', there is no slipping and an accurate measurement of the length of the carpet is stamped thereon with a degree of accuracy which is as great as the accuracy with which stencil 140' is made.

If the manufacturer desires to record the amount of material passing through apparatus 100, servo control circuit 108 may be used to provide an electrical output on a line 160 which is an indication of the rotation of sensing wheel 154 as sensed by master encoder 102. Such output may be reset every time solenoids 155 and 155' are actuated. The signal on line 160 may be applied to a counter 161 which may be used to print out the length of each roll of carpet. Such output may also be applied to a second counter 162 which may be used to record the total amount of carpet passing through apparatus 100.

As was the case with apparatus 10, apparatus 100 is provided with identical printing mechanisms 135 and 135' so that during the time that one mechanism is operating, the other mechanism is rewinding tape 140 or 140' onto spools 137 or 137', respectively, so that it will be ready to mark linear units on the back of the next roll of carpet. The rewinding procedure with apparatus 100 is as follows:

FIG. 4 shows the condition of apparatus 100 for a situation where printing mechanism 135 has just ceased operation and tape 140 is wound onto spool 136 and where tape 140' is wound onto spool 137' ready to commence operation. To reverse the operation, solenoids 155 and 155' are activated to lower roller 143 and to elevate roller 143', respectively. Simultaneously, clutches 120 and 121 would be deactivated to disconnect drive means 110 from servo system 101 and clutches 120' and 121' would be activated to connect drive means 110' to servo system 101. Also at this time, clutch 139 would be activated and clutch 138 deactivated to rewind tape 140 onto spool 137 and clutch 138' would be activated and clutch 139' deactivated to take up tape 140' onto spool 136'. As a result, clutch 139 immediately causes spool 137 to rotate in a clockwise direction to completely rewind tape 140, drive wheels 104 and 111 and spool 136 being completely disconnected.

Apparatus 100 may be provided with one or more additional inking mechanisms of the type described with respect to apparatus 10 to print identifying markings on the back side of the carpet at the same time that the linear units are being printed thereon. Since such apparatus has been previously described fully, such apparatus has been eliminated from apparatus 100. Furthermore, apparatus 100 may include means for exerting pressure on the top of the carpet as it passes therethrough to insure positive engagement between sensing roller 154 and inking rollers 143 and 143' and the back of the carpet to prevent slipping of one relative to the other. Again, since such apparatus has been fully described with respect to apparatus 10, it has been eliminated from the showing of apparatus 100.

It can therefore be seen that in accordance with the present invention there is provided an improved apparatus for measuring the length of a roll of carpet or other material and for simultaneously marking thereon, in numbered linear units, the length thereof from the beginning of the roll. The present apparatus provides a positive and accurate measurement of the length of the material in the roll. According to the present apparatus, the complex mechanical constructions of the prior art together with their inherent inaccuracies are completely eliminated by the use of a tape having a finite length which is always equal to or greater than the length of the material to be measured, the opposite ends of the tape being rolled on a pair of spools and the tape being driven directly by and with the material as the material passes by the measuring apparatus. Because of the highly accurate measurement provided by the present apparatus, a considerable saving may be achieved by a manufacturer. Furthermore, by periodically marking the length of the carpet directly thereon, both the manufacturer and the retailer will, at all times, know exactly how much carpet remains in a roll. In addition, by placing the markings on one edge of the carpet, the retailer may use the markings to keep track of the direction of the carpet pile. Finally, by printing identifying markings on the back of the carpet simultaneously with the printing of the length markings, the manufacturer and the retailer will be always able to determine, simply by inspecting the carpet, its fiber content, pattern name, number, and/or color, the manufacturer's roll number, etc. Such markings will also satisfy, in a permanent manner, the FTC regulations pertaining to identifying the fiber content on the merchandise.

While the invention has been described with respect to the preferred physical embodiments constructed in accordance therewith, it will be apparent to those skilled in the art that various modifications and improvements may be made without departing from the scope and the spirit of the invention. Accordingly, it is to be understood that the invention is not to be limited by the specific illustrative embodiments, but only by the scope of the appended claims.

We claim:

1. An apparatus for measuring the length of a roll of material and for marking the measured length on said material comprising:

a wheel having a plurality of teeth extending radially from the periphery thereof;

means for mounting said wheel on an axis so as to be rotatable thereabout;

means for holding said material in intimate contact with said wheel such that when said material is caused to be conducted passed said wheel in a direction substantially perpendicular to the axis of said wheel, said wheel is caused to rotate about said axis;

an elongated tape having perforations cut therein to define a stencil, said perforations indicating linear units, said linear units being spaced along said tape from a starting point by an amount equal to the distance said units represent from said starting point, said tape having a finite length which is always equal to or greater than the length of said material to be measured, said tape having a series of sprocket holes spaced longitudinally therealong, said teeth on said wheel extending through said sprocket holes in said tape and driving said tape with said material as said material is conducted past said wheel;

first and second spool mounted for rotation, the opposite ends of said tape being wound on said spools;

inking means operatively contacting one side of said tape and cooperating with said linear units by passing ink through said perforations for printing said linear units on one side of said material;

means, including said wheel and said inking means, for positioning said tape with the other side thereof in contact with said one side of said material.

2. The combination of claim 1 including:

first and second shafts, said first and second spools being mounted on said first and second shafts respectively;

means for rotating said shafts in opposite directions;

first clutch means operatively connected between said first shaft and said first spool for selectively causing said first spool to rotate in a direction to wind said tape thereon;

second clutch means operatively connected between said second shaft and said second spool for selectively causing said second spool to rotate in a direction to wind said tape thereon;

and said means for positioning being selectively operable to disengage said wheel from said tape, said first clutch means causing said first spool means to wind said tape thereon when said wheel is engaged and said second clutch means causing said spool to wind said tape thereon when said wheel is disengaged.

3. The combination of claim 2 wherein said first and second clutch means are friction clutches, said second friction clutch exerting a greater force on said second spool than the force exerted by said first friction clutch on said first spool, wherein said rotating means pulls said tape towards said first spool so that said tape is wound thereon when said wheel is engaged and wherein said tape is rewound on said second spool when said wheel is disengaged.

4. The combination of claim 2 including:

a second wheel having a plurality of teeth extending radially from the periphery thereof;

means for mounting such second wheel on an axis so as to be freely rotatable thereabout;

a second elongated tape having perforations cut therein to define a second stencil, said perforations indicating linear units, said linear units being spaced along said second tape from a starting point by an amount equal to the distance said units represent from said starting point, said second tape having a finite length which is always equal to or greater than the length of said material to be measured, said second tape having a series of sprocket holes spaced longitudinally therealong, said teeth on said second wheel extending through said sprocket holes in said second tape whereupon rotation of said second wheel causes linear movement of said second tape;

third and fourth spools mounted on said first and second shafts respectively;

third clutch means operatively connected between said first shaft and third spool for selectively causing said third spool to rotate in a direction to wind said second tape thereon;

fourth clutch means operatively connected between said second shaft and said fourth spool for selectively causing said fourth spool to rotate in a direction to wind said second tape thereon;

and a second inking means operatively contacting one side of said second tape and cooperating with said linear units by passing ink through said perforations for printing said linear units on said one side of said material;

second means, including said second wheel and said second inking means, for positioning said second tape with the other side thereof in contact with said one side of said material;

said second means for positioning being selectively operable to disengage said second wheel from said second tape, said third clutch means causing said third spool to wind said second tape thereon when said second wheel is engaged and said fourth clutch means causing said fourth spool to wind said second tape thereon when said second tape is disengaged;

whereby, lengths of rolls of material can be continuously measured and marked with said second tape as said first mentioned tape is being rewound from said first spool to said second spool.

5. An apparatus for measuring the length of a roll of material and for marking the measured length on said material comprising:

a sensing wheel;

means for mounting said wheel on an axis so as to be rotatable thereabout;

means for conducting said material past said wheel in intimate contact with the periphery thereof so that said material rotates said wheel about said axis as said material passes thereover, an elongated tape having perforations cut therein to define a stencil, said perforations indicating linear units, said linear units being spaced along said tape from a starting point by an amount equal to the distance said units represent from said starting point, said tape having a finite length which is always equal to or greater than the length of said material to be measured;

first and second spools mounted for rotation, the opposite ends of said tape being wound on said spools;

means for positioning said tape with one side thereof in contact with one side of said material;

means for driving said tape with said material from said second spool to said first spool as said material is conducted past said wheel, said means including a driving wheel, said driving wheel being coupled to said sensing wheel and driving said tape at a linear velocity equal to the velocity of the periphery of said sensing wheel as said sensing wheel is caused to rotate by said material;

and inking means operatively contacting the other side of said tape and cooperating with said linear units by passing ink through said perforations for printing said linear units on said one side of said material.

6. The combination of claim 5 wherein said driving means further includes motor means for driving said drive wheel;

means for sensing the angular position of said sensing wheel and for generating a first electrical signal indicating said position;

means for sensing the angular position of said drive wheel and for generating a second electrical signal indicating said angular position;

and means responsive to said first and second electrical signals for actuating said motor means to cause said drive means to move said tape at a linear velocity equal to the velocity of the periphery of said sensing wheel as said wheel is caused to rotate by said material.

7. An apparatus for measuring the length of a roll of material and for marking the measured length of said material comprising:

a sensing wheel;

means for mounting said wheel on an axis as to be rotatable thereabouts;

means for conducting said material past said wheel in intimate contact with the periphery thereof so that said material rotates said wheel about said axis as said material passes said wheel;

an elongated tape having perforations cut therein to define a stencil, said perforations indicating linear units, said linear units being spaced along said tape from a starting point by an amount equal to the distance said units represent from said starting point, said tape having a finite length which is always equal to or greater than the length of said material to be measured, said tape having a series of sprocket holes spaced longitudinally therealong;

first and second spools mounted for rotation, the opposite ends of said tape being wound on said spools;

means for positioning said tape with one side thereof in contact with one side of said material;

means for driving said tape with said material from said second spool to said first spool as said material is conducted past said wheel, said means comprising a drive wheel having teeth extending through said sprocket holes in said tape, motor means for driving said drive wheel and means for sensing the angular position of said sensing wheel and for actuating said motor means to cause said drive wheel to drive said tape at the linear velocity equal to the velocity of the periphery of said sensing wheel as said sensing wheel is caused to rotate by said material;

and inking means operatively contacting the other side of said tape and cooperating with said linear units by passing ink through said perforations for printing said linear units on said one side of said material.

8. The combination of claim 7 wherein said sensing means comprises:

means for sensing the angular position of said sensing wheel for generating a first electrical signal indicating said angular position;

means for sensing the angular position of said drive wheel and for generating a second electrical signal indicating said angular position;

and means responsive to said first and second electrical signals for actuating said motor means to cause said drive wheel to drive said tape at a linear velocity equal to the velocity of the periphery of said sensing wheel as said wheel is caused to rotate by said material.

9. The combination of claim 7 including a second elongated tape having perforations cut therein to define a second stencil, said perforations indicating linear units, said linear units being spaced along said second tape from a starting point by an amount eqaul to the distance said units represent from said starting point, said second tape having a finite length which is always equal to or greater than the length of said material to be measured, said second tape having a series of sprocket holes spaced longitudinally therealong;

third and fourth sprockets mounted for rotation, the opposite ends of said second tape being wound on said third and fourth spools;

means for selectively positioning said second tape with one side thereof in contact with said one side of said material;

means for driving said second tape with said material from said fourth spool to said third spool as said material is conducted past said sensing wheel, said means for driving said second tape comprising a second drive wheel having teeth extending through said sprocket holes in said second tape, means for securing said second drive wheel to said motor means, means for sensing the angular position of said sensing wheel and for actuating said motor means to cause said second drive wheel to drive said second tape at the linear velocity equal to the velocity of the periphery of said sensing wheel as said sensing wheel is caused to rotate by said material;

control means for actuating said second drive wheel to drive said second tape when said second tape is in contact with said one side of said material and for actuating said first drive wheel to drive said first tape when said first tape is in contact with second one side of said material;

second inking means operatively contacting the other side of said second tape and cooperating with said linear units by passing ink through said perforations for printing said linear units on said one side of said material;

means for selectively disengaging said first mentioned tape driving means;

and means for selectively disengaging said second tape driving means;

whereby, lengths of rolls of material can be continuously measured and marked with said second tape as said first mentioned tape is rewound from said first spool to said second spool.

* * * * *